BEST AVAILABLE COPY

Oct. 28, 1952 R. F. SOPRIS Re. 23,569

DEVICE FOR INSERTING BOLTS IN CONCRETE

Original Filed Sept. 16, 1946 4 Sheets-Sheet 1

INVENTOR.
ROBLEY F. SOPRIS.
BY Huebner, Walthy & Brucker
ATTORNEYS.

Oct. 28, 1952 R. F. SOPRIS Re. 23,569

DEVICE FOR INSERTING BOLTS IN CONCRETE

Original Filed Sept. 16, 1946 4 Sheets-Sheet 2

INVENTOR.
ROBLEY F. SOPRIS.
BY Fulbright, Walthy & Beecher

ATTORNEYS.

DEVICE FOR INSERTING BOLTS IN CONCRETE

Original Filed Sept. 16, 1946 4 Sheets-Sheet 3

INVENTOR.
ROBLEY F. SOPRIS.
BY Huebner, Walthy & Brucker
ATTORNEYS.

Oct. 28, 1952 R. F. SOPRIS Re 23,569

DEVICE FOR INSERTING BOLTS IN CONCRETE

Filed Sept. 16, 1946 4 Sheets-Sheet 4

INVENTOR.
ROBLEY F. SOPRIS.
BY Huebner, Beatty & Beecher
ATTORNEYS.

Reissued Oct. 28, 1952 Re. 23,569

UNITED STATES PATENT OFFICE 23,569

DEVICE FOR INSERTING BOLTS IN CONCRETE

Robley F. Sopris, Cuernavaca, Mexico, assignor, by mesne assignments, to Daniel W. Creary, Portland, Oreg.

Original No. 2,518,395, dated August 8, 1950, Serial No. 697,341, September 16, 1946. Application for reissue July 10, 1951, Serial No. 235,913

15 Claims. (Cl. 1—47)

Matter enclosed in heavy brackets [ ] appears in the original patent but forms no part of this reissue specification; matter printed in italics indicates the additions made by reissue.

The invention relates to a device adapted to imbed bolts, studs and other fastening means in set concrete or similar substances by the operation of driving the bolt, stud or similar device forcibly into the solidified concrete material.

When structures of the nature of concrete or masonry walls, foundations, floors, pilasters, beams and the like are built of masonry, concrete or other structural materials which are extremely dense in final form, a problem arises when fastening devices are to be embedded therein which may be necessary for attaching other parts of the structure.

If the wall or structure should be of concrete, fastening devices are frequently set in the forms before the concrete is poured, and when the concrete eventually surrounds the fastening means and solidifies, the fastening means is securely held in its proper position.

If the concrete or masonry structure is already erected, the problem of attaching thereto some fastening means or other is made more difficult. It then becomes necessary to drill a hole in the hard masonry substance, set an anchoring portion of the fastening means in place and then pack the hole so that the fastening means cannot be pulled out. The latter method is laborious and time-consuming.

In the fabrication of concrete or masonry building structures it is frequently necessary to provide an extensive metal piping system such as plumbing which must be fastened in some manner to the structure. On other occasions electric wiring may need to be secured in conduits fastened to the structure. On still other occasions shelves, beams, floors or a variety of other appurtenances might need to be hung upon the structure for some purpose or other. At times a very considerable weight must be attached to the fastening means necessitating the means being imbedded in the structure with exceptional firmness.

It is, therefore, among the objects of the invention to provide an apparatus for driving fastening means of one type or other into a masonry structure so that the operation can be performed quickly, easily and at low cost.

Another object of the invention is to provide a new and improved apparatus for driving fastening devices into masonry or similar structures which is easy to handle and manipulate, easy to load and unload, and which is comfortable to use so that the operator will not tire after prolonged use of the device.

Still another object of the invention is to provide a new and improved gun for firing fastening devices into walls comprising dense solid aggregate wherein there is included a cushioning device for absorbing the recoil of new and improved design.

A further object is to provide in a gun for firing fastening devices into a wall structure means for utilizing the force of an explosive discharge to assist in sustaining the foot of the gun against the wall structure in order to improve the penetration of the projectile and to minimize rupture of the immediately adjacent surface of the wall structure upon penetration.

A still further object of the invention is to provide in a gun for firing fastening devices into wall structures a control for by-passing regulated amounts of the propelling gas generated by an explosive discharge so that the amount of penetration of the fastening device into the wall structure can be carefully controlled and adjusted.

A further object still is to provide a fastening means for driving into a wall structure under force of an explosive discharge which is specially designed so as to facilitate its travel through a gun barrel and which is adapted to be provided with an auxiliary means arranged to be forced into contact with the surface of the wall structure upon impact of the fastening device so as to minimize fracture and cratering of the wall structure at the point of penetration.

With these and other objects in view, the invention consists in the construction, arrangement and combination of the various parts of the device whereby the objects contemplated are attained, as hereinafter more fully set forth, pointed out in the claims and illustrated in the accompanying drawings, in which:

Figure 1:
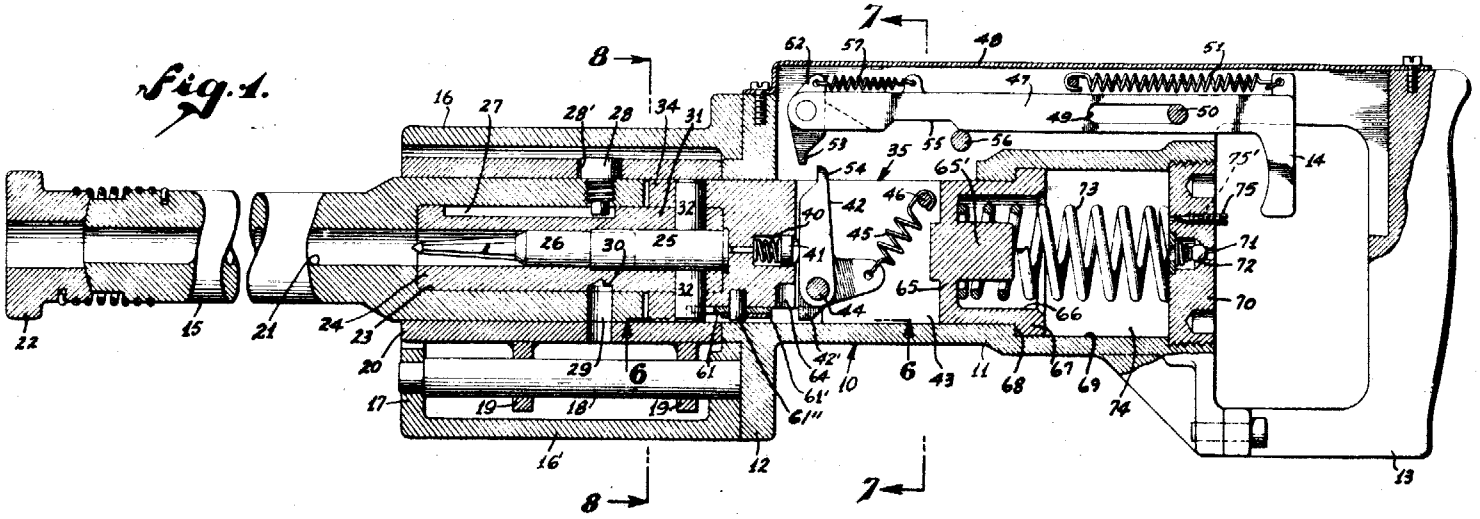
Figure 1 is a longitudinal, sectional view of a gun showing the interior mechanism.

Principles of design and operation of a gun of similar construction have been disclosed in applications, Serial No. 645,400, filed February 4, 1946, and issued as U. S. Letters Patent No. 2,504,311 on April 18, 1950, and Serial No. 392,896, filed May 10, 1941, and issued as U. S. Letters Patent No. 2,400,878, on May 28, 1946, of which the disclosure herein constitutes an improvement.

In an embodiment of a gun chosen to illustrate the application of the novel features contained in the application there is shown a gun casing 10 consisting of a recoil section 11 and a barrel-holding section 12. At the end of the recoil section is a handle 13 in which is incorporated a trigger 14, and at the end of the barrel-holding section is a gun barrel 15.

Figure 5:
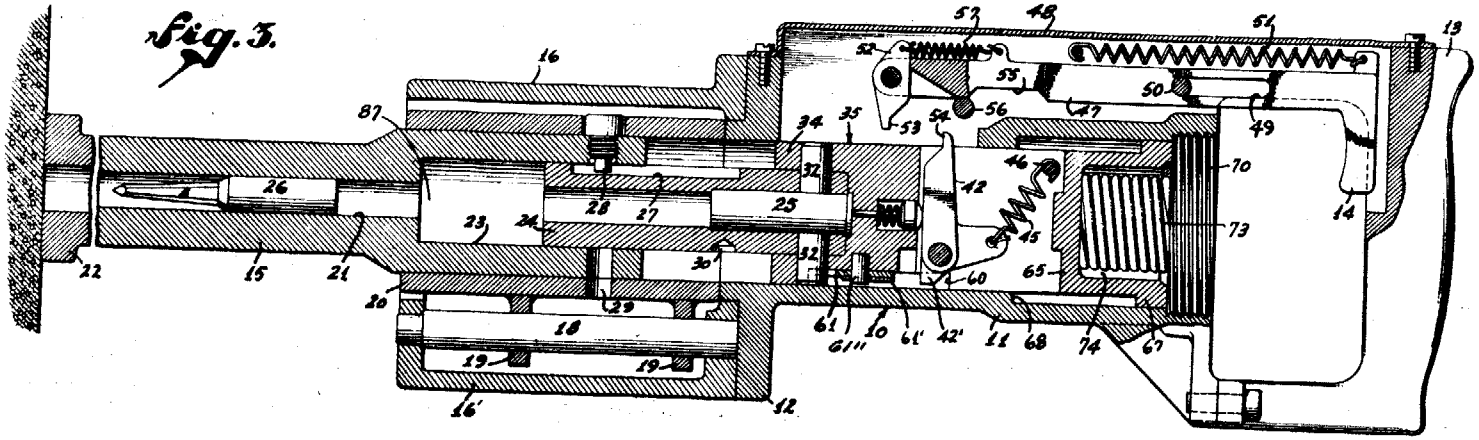
Figure 5 is a fragmentary view partially in section showing a means of attaching the gun barrel to the recoil mechanism.
Figure 8:
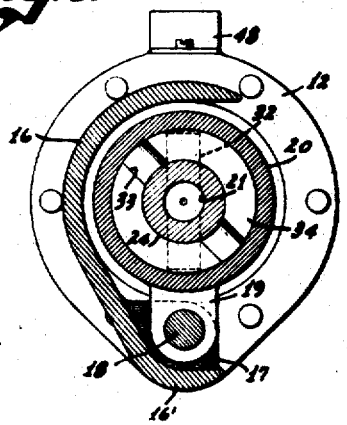
Figure 8 is a cross-sectional view taken on the line 8—8 of Figure 1.
Figure 9:
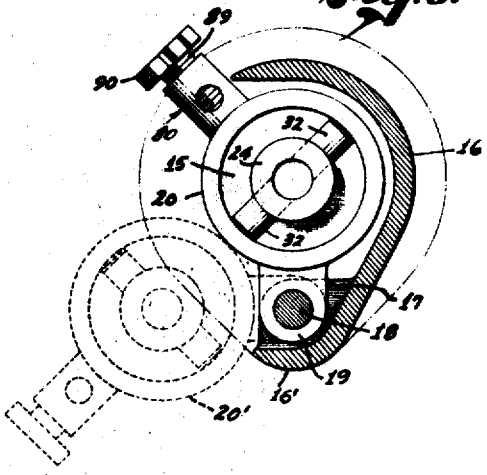
Figure 9 is a cross-sectional view taken on the line 9—9 of Figure 5.

To facilitate operation of the gun and particularly to permit the gun to be broken open for reloading purposes the barrel-holding section 12 and a barrel-holding sleeve 20 are hinged together. The hinge consists of a bracket member 16, illustrated in some detail in Figures 8 and 9, which is bolted or otherwise secured to the main portion of the barrel-holding section 12. The bracket member 16 is provided with a hinge portion 16' and lugs 17 adapted to receive a hinge pin 18 which likewise extends through lugs 19 on the barrel-holding sleeve 20. By reason of the fact that the bracket member 16 extends only partially around the lugs 19 providing an open space of greater width than the barrel-holding sleeve 20 the sleeve is adapted to be pivoted about the hinge pin and extended outwardly to the dotted position 20' illustrated in Figure 9. This is the position of the barrel-holding sleeve and the barrel when the gun is to be loaded. It will be understood that release of a bayonet joint, illustrated in Figure 5, admits of separation of adjoining parts so that the hinge-mounted parts are free to rotate.

The barrel 15 itself contains an axial discharge bore 21 and may be provided with a foot member 22 at the muzzle end, details of which are disclosed in the pending application above identified.

Figure 15:
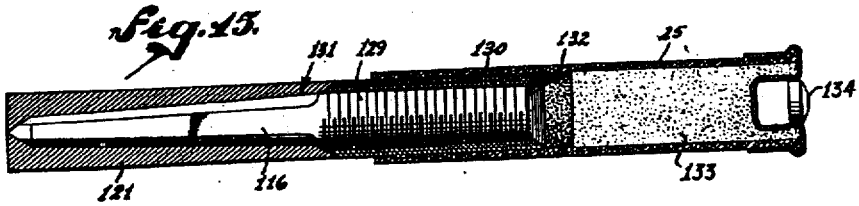
Figure 15 is a longitudinal, sectional view of a cartridge adapted to be fired in the gun.

At the breech end of the barrel is an enlargement 23 which is adapted to receive a shell-carrying sleeve 24, the shell-carrying sleeve having a sliding relationship with the barrel in its location within the enlargement 23. The shell-carrying sleeve is adapted to be loaded with a cartridge comprising a shell casing 25 having a projectile-like fastening device 26 attached at the discharge end. Details of one type of cartridge are illustrated in Figure 15 and will be subsequently described.

Figure 2:
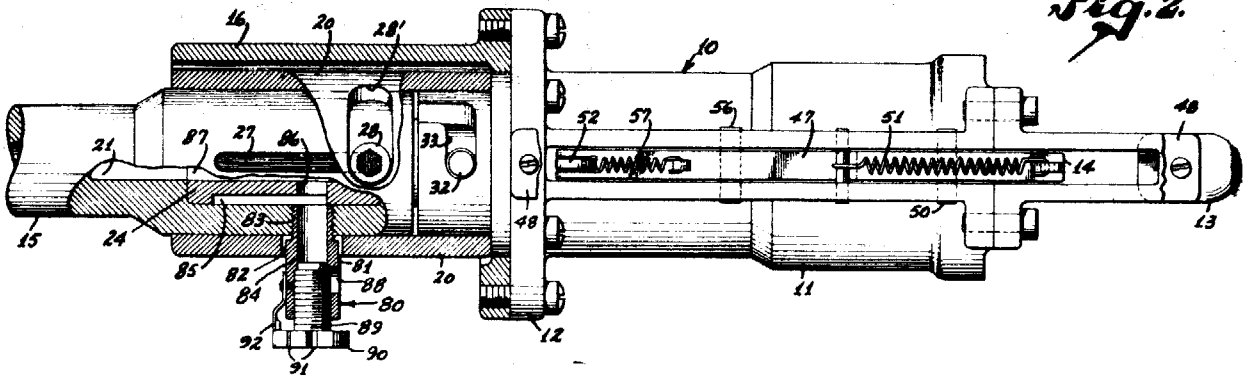
Figure 2 is a plan view of the gun shown in Figure 1 partially in section.

In order that the shell-carrying sleeve may be retained within the enlargement, the sleeve is provided with a longitudinal recess 27, and into this extends a stud 28, the stud being retained in the surrounding portion of the barrel and adapted to extend outwardly through a suitable aperture 28' in the barrel-holding sleeve 20, the shape of which is shown in Figure 2, so that the stud may be removed by use of a screw driver when necessary. An oppositely disposed auxiliary aperture 29 is provided immediately adjacent a corresponding recess 30 in the shell-carrying sleeve to assist in manipulating the parts in the event that the inner end of the stud 28 might become broken off for any reason.

It will be observed that the shell-carrying sleeve has an end portion 31 which extends endwise beyond the breech end of the barrel when the shell-carrying sleeve is received to its full depth within the enlargement 23. The endwise extending portion is provided with oppositely disposed studs 32, illustrated in particular in Figures 2 and 5, where they are shown as being adapted for reception in bayonet slots 33 in a breech section 34 of a recoil block 35.

The recoil block 35 fits slideably within the recoil section 11 of the gun casing 10 in a position such that the breech section thereof is normally presented to the breech end of the gun barrel. Within the breech section is a pocket 40 adapted to receive a spring-pressed firing pin 41.

Figure 7:
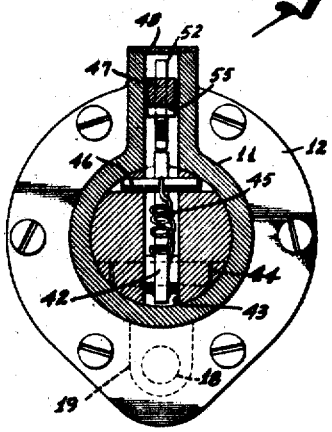
Figure 7 is a cross-sectional view taken on the line 7—7 of Figure 1.

For actuating the firing pin there is provided a bell crank lever 42 located within a slot 43, appearing in cross-section in Figure 7, wherein the bell crank lever is pivotally mounted by means of a pivot pin 44. The lever is normally held in the position shown in Figure 1 by means of a tension spring 45 stretched between one arm of the lever and a pin 46 in the recoil block.

For tripping the bell crank lever there is provided an extension 47 on the trigger 14 housed within a cover 48, the extension being slideably mounted by means of a slot 49 and pin 50. A spring 51 holds the trigger down. At the inside end of the extension is a pivoted, spring-retained cam 52 having a finger 53 adapted to engage a corresponding finger 54 on the bell crank lever. So that the extension may move laterally to a position where the fingers can engage there is provided a recess 55 adapted to receive a cam pin 56 and thus permit the extension to shift toward the bell crank lever where the fingers will engage.

Figure 4:
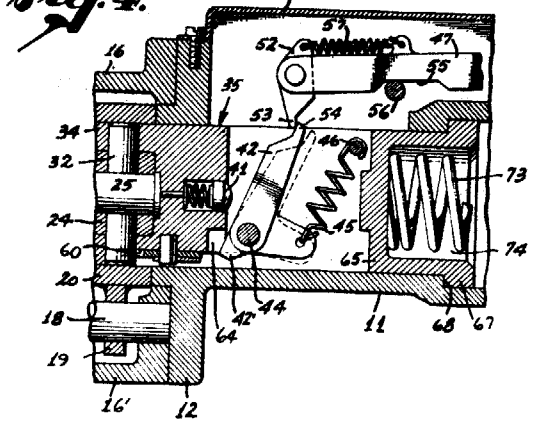
Figure 4 is a fragmentary, sectional view of the firing mechanism.

Since the spring-retained pivot cam is limited in its rotation clockwise, as viewed in Figure 1, when the trigger is pulled the finger 53 will lift the bell crank lever building up tension in the spring 45. Near the end of its movement engagement of the portion of the lever 47 adjacent the recess with the pin 56 will cause the fingers to slip out of engagement, and the spring 45 will rotate the bell crank lever through its firing stroke against the firing pin 41. A spring 57 allows the pilot cam to shift to a position permitting it to pass the finger 54 on recoil of the breech block. Likewise on return to initial position the portion of the lever on the other side of the recess 55 will engage the pin 56 and hold fingers 53 and 54 out of engagement. Figure 4 illustrates the firing mechanism in one of its operating positions and will facilitate an understanding of its operation.

In order that the barrel 15, the barrel-holding sleeve 20 and the recoil block 35 may act as a unit when the parts of the gun are locked together in a firing arrangement, means is provided for preventing unlocking of the bayonet joint previously described and also for interlocking the bayonet joint with the firing mechanism. Details of the inter-locking relationship are shown in detail in Figure 6.

Figure 6:
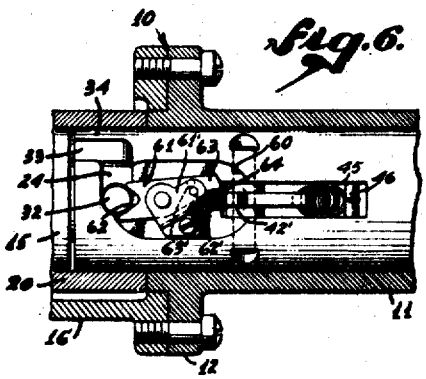
Figure 6 is a fragmentary, sectional view taken in the direction of the arrow 6 of Figure 1.

As illustrated in Figure 6, within a recess 60 of the breech section 34 is a clip 61' upon which is pivotally mounted a lever 61. This lever is provided with a V-shaped slot 62 at one end adapted to receive in one position one of the studs 32 when the stud is at the end of the bayonet slot. In this position the other end 63 of the lever is moved away from engagement with a projection 42' of the bell crank lever 42, thereby permitting the bell crank lever to move freely, projection 42' entering a recess 64 in firing position shown in Figure 4. This means that the bell crank lever 42 can be actuated to a firing position only when the gun barrel is securely locked in place in relation to the recoil block.

When the stud 32 is shifted out of the bayonet slot, movement of the stud rotates the lever 61 about a pin 6'' through a short distance in a clockwise direction, as viewed in Figure 6, sufficient to shift the end 63 to a position beneath the projection 42', preventing rotation of the bell crank lever, and thereby locking the firing mechanism. A temporary detent comprising a pimple 62' on the clip and a recess 63' in the lever 61 holds the parts normally in locked position against firing.

So that the recoil existent at the time of discharge may be absorbed to reduce bucking of the gun at the handle a cushion is provided operative against the recoil block. To be effective the recoil block is provided at one end with a cup-shaped piston section 65 having a hollow interior portion 66 and a shoulder 67 thereon. The shoulder is adapted to engage a corresponding shoulder 68 located at the bottom of a cylindrical bore 69. The end of the cylindrical bore opposite from the piston section 65 has screwed therein a closure 70 at the center of which is an aperture 71 adapted to receive a spring-pressed ball check 72 opening inwardly. A heavy coiled spring 73 is located between the closure and the piston section 65 normally acting to press the recoil block 35 to a position where the shoulders 67 and 68 engage, as illustrated in Figure 1.

Figure 3:
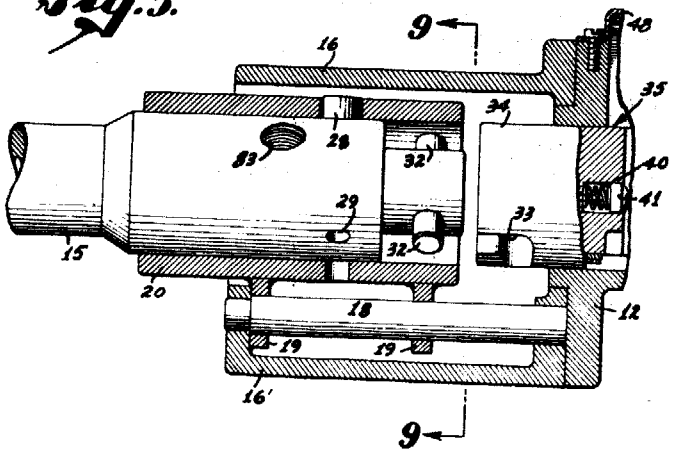
Figure 3 is a longitudinal, sectional view of the gun shown in Figure 1 with the working parts in the positions they would occupy at the moment of discharge.

When the gun is fired the force which counteracts the explosion driving the projectile 26 outwardly is received by the recoil block 35 through the breech section 34 against which the shell casing 25 presses. By reason of the fact that the shell-carrying sleeve 24 is locked to the breech section 34 these two parts shift as a unit from the position shown in Figure 1 to the position shown in Figure 3. During this shift the coiled spring 73 is compressed to the position shown in Figure 3 and may be guided during compression by a spring keeper 65'.

The cushioning of the recoil is accomplished by the compression of air within the cylindrical bore 69 which may aptly be designated as a gas or air pocket 74. When the volume of the pocket 74 is reduced by movement of the piston section 65 to the position shown in Figure 3, some air may be allowed to escape through an adjustable valve 75 by way of a slot 75'. By means of the valve the effectiveness of the recoil may be varied by adjustment. As soon as the firing action is completed and the discharge of the projectile finished, the spring 73 will return the recoil block to its initial position, and action of the ball check 72 will prevent the creation of any retarding vacuum effect in the pocket 74 which would prevent prompt return of the parts to initial position.

On occasions the material comprising the structure in which the fastening device is to be driven may be sufficiently soft to require less explosive force in order to drive the device into the wall to a suitable depth. If the same force is used as would be used for harder materials, the fastening device would travel into the wall too far or might even be driven completely through the wall. While a lighter explosive charge could be employed by selecting a shell of less capacity, it is not convenient to have a variety of shells of different capacity where shells of uniform capacity can be manipulated so as to do the job properly under all circumstances.

In order, therefore, to control the effect of the explosive charge upon the fastening device, means is provided in the gun for permitting by-passing or escape of regulated quantities of the explosive gas generated when the gun is discharged. This means takes the form of a valve indicated generally by the character 80. Specifically, the valve consists of a fitting 81 which extends freely through an aperture 82 in the barrel-holding sleeve 20 and is threadably secured within a suitable threaded aperture 83 in the barrel itself at the breech end thereof.

The fitting is provided with an escape bore 84 which communicates with an escape chamber 85 on the exterior of the shell-carrying sleeve 24. This escape chamber communicates by means of a transverse connecting passage 86 with the breech end of the discharge bore 21 in the gun barrel which may be considered as an explosion chamber 87. It should be noted that the location of the transverse passage 86 is spaced at a distance from the breech end of the shell-carrying sleeve slightly greater than the length of the shell itself. The escape chamber 85 is shown as having considerable length so that it communicates with the escape bore 84 regardless of the position of the shell-carrying sleeve in the barrel.

The fitting is provided with a laterally disposed relief port 88. The port may be closed to a greater or lesser extent by means of a threaded thumb screw 89 roughened at the portion 90 to facilitate gripping. The portion 90 may likewise be provided with index graduations 91 cooperable with a pointer or stop 92 by means of which the setting of the thumb screw is retained and indicated.

When the gun is discharged some portion of the explosive gas is permitted to escape at the relief port through the passages described and thus reduce the explosive force behind the fastening device which travels through the barrel as a projectile. The amount of opening of the valve 80 can be readily controlled so as to adjust the force behind the projectile to any desired quantity.

In order to operate the gun satisfactorily, the whole weight of the apparatus must be supported by the operator and the gun pressed forcibly against the wall when it is discharged. In devices heretofore provided the weight of the apparatus constituting a certain amount of inertia, coupled with the strength of the operator, has been relied upon in order to press the gun with sufficient force against the surface into which the fastener is driven. The work of the operator can be made more easy and the operation more positive by the utilization of some of the force of exploding gases for the purpose of pressing the muzzle of the gun against the wall. This has the further advantage of providing a support for the wall in order to reduce to some extent shattering of the surface of the wall adjacent the point of penetration of the projectile comprising the fastening device.

Figure 12:
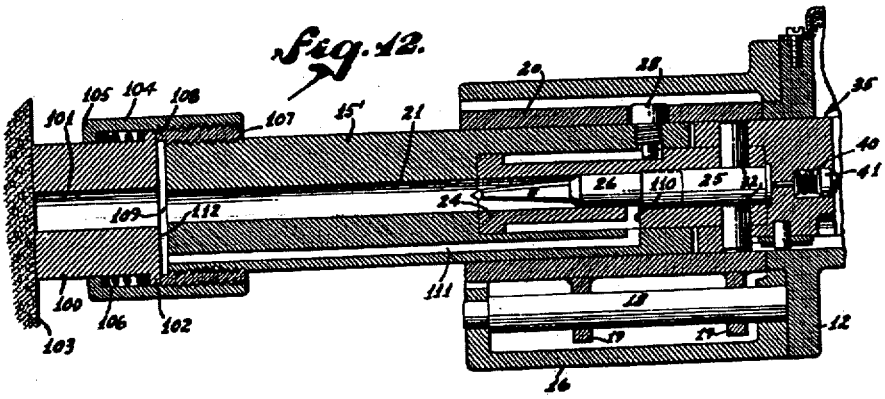
Figure 12 is a sectional view of the barrel end of a gun featuring a special attachment in the muzzle.

A suitable bucking block 100 is illustrated as being attached to the muzzle end of a barrel 15' in Figure 12. In this modified form of the device the bucking block consists of a cylindrical piece having an axial bore 101 in alignment with the discharge bore 21 of the barrel, the bore 101, however, being slightly larger in diameter than the bore 21. The bucking block is provided with a flange or shoulder 102 at the end remote from the end in contact with the wall surface 103. A sleeve 104 surrounds the bucking block and the muzzle end of the barrel and is provided with a shoulder 105 in opposed relation to the shoulder 102. A spring 106 is positioned between the two shoulders.

The sleeve 104 is threaded upon a bushing 107 which in turn is threadably engaged with the muzzle end of the gun barrel, the sleeve being so arranged with respect to the barrel that a short portion 108 extends beyond the end of the barrel. By this device there is provided a chamber or space 109 between the end of the bucking block and the face of the muzzle end of the barrel.

In order that a portion of the explosive discharging gases may be applied against the bucking block, the shell-carrying sleeve 24 is provided with a transverse gas passage 110 located at a distance from the breech end of the barrel slightly greater than the length of a shell. The transverse gas passage communicates with a longitudinally disposed auxiliary bore 111 spaced laterally from the parallel to the axis of the discharge bore 21.

The explosive gas which is generated upon the firing of the gun is primarily directed to advancing the projectile-like fastening device into penetrating engagement with the wall surface 103. However, some of the force of the explosion is diverted through the transverse gas passage 110 and thence through the auxiliary bore 111 into the space 109. There some of the force of the expanding gases is applied against a transversely disposed face 112 at the end of the bucking block and tends to press the bucking block against the wall surface. Since there is some recoil effect when the gun is discharged the barrel will tend to move at the same time from left to right as the space 109 tends to expand. Movement of the barrel with respect to the bucking block is cushioned or dampened to some extent by the spring 106.

Figure 13:
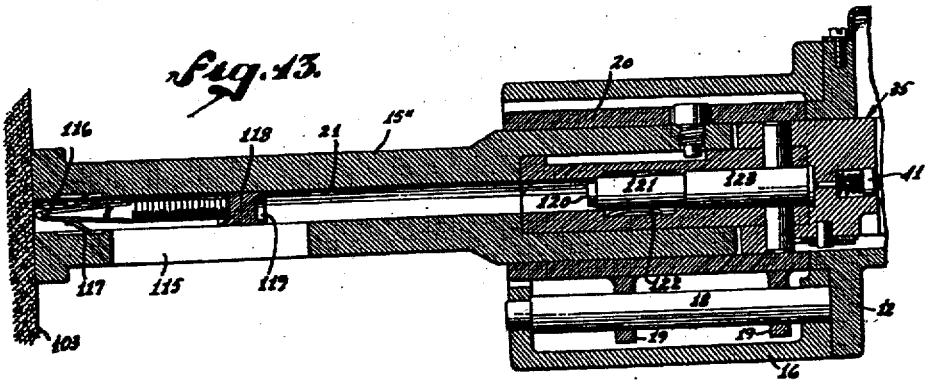
Figure 13 is a sectional view of the barrel end of a gun of modified construction.

In a modified form of the device shown in Figure 13 there is provided a gun wherein the fastening device is located with its point in contact with the wall, and a slug or piston is driven against it by the explosive force of a blank cartridge.

Specifically, in the modified form of the device a barrel 15'' is mounted in the usual way in a barrel-holding sleeve 20 in turn retained by the barrel-holding section 12 of the gun casing. In this form, however, there is provided a lateral discharge opening 115 near the muzzle end of the gun and having considerable length. The projectile-like fastening bolt of selected design is shown located within the discharge bore 21 with its point 116 in contact with the wall 103. The fastening device is retained in position by means of pressure of springs 117 located within the bore 21 adjacent the muzzle end.

At the rear of the fastening device is an anvil 118 which may be cupped at the advance end to receive the adjacent end of the fastening device and also cupped at 119 for reception of a correspondingly sized end 120 of a piston 121. The piston also is temporarily retained in position at the breech end of the barrel by means of spring fingers 122. A blank cartridge 123 is used to generate an explosion discharge.

When this form of the device is operated, the parts initially have the positions shown in Figure 13. When the blank cartridge is exploded, the piston 121 is driven with great force against the anvil 118, and the force of the piston is thereby transferred to the rear end of the projectile-like fastening device which is driven into the wall 103. When the piston has completed its advance and has moved the fastening device inwardly toward the wall, the expanding explosive gases will be permitted to escape behind the piston through the lateral discharge opening 115.

When a projectile-like fastening device having a hardened pointed tip 116 is driven into a wall 103, which may be of relatively dense hard concrete, there is a tendency under force of impact of the hardened tip to shatter the surface of a wall and to produce a crater immediately adjacent the fastening device. Cratering or shattering of the wall can be minimized to some extent by the application of pressure through some means or other to the surface.

Figure 14:
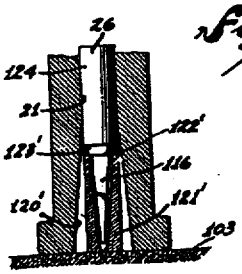

In Figure 14 there is shown a frusto-conical, tapered space 120' at the muzzle end of the discharge bore 21. For utilization of this form of discharge bore the projectile 26 having the hardened pointed tip 116 has applied therearound a pressure piece 121' shown as having a cylindrical exterior form in Figure 14. One end 122' of the pressure piece is shown abutting a shoulder-like portion 123' on the projectile.

In this modified form when the projectile carrying the pressure piece 121 hits the wall 103 the pressure piece will be expanded into the frusto-conical, tapered space 120' by travel of the remaining portion of the projectile through it and at the same time will exert a great amount of force on the face of the wall immediately adjacent the point of penetration of the hardened pointed tip.

Figure 16:
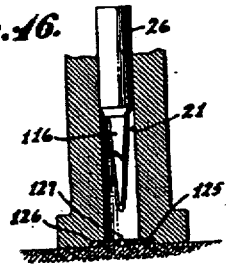
Figures 14 and 16 are fragmentary, sectional views of the muzzle end of a barrel showing different forms which the bore in the barrel may assume for cooperation with a device for minimizing cratering at the point of impact.

As an alternative means of utilizing the principle described in connection with Figure 14 there is shown in Figure 16 a flat recess 125 at the muzzle end of the bore 21. Positioned in the recess is a disc 126 having a central perforation 127. As appears, the disc is shown directly in contact with the surface of the wall structure 103. In this form when the hardened pointed tip 116 hits the disc it will penetrate the disc at the center point traveling through the aperture 127 and spreading the disc outwardly against the wall of the recess 125 and forwardly against the face of the wall 103. Such force will be exerted upon the disc that there will be provided sufficient pressure to prevent shattering or cratering of the surface of the wall at the point of penetration.

Figure 10:
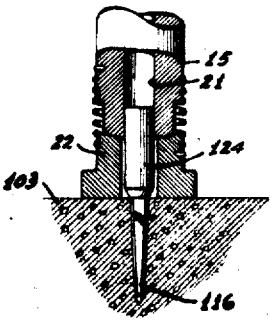
Figure 10 is a fragmentary, sectional view of the end of the barrel showing a projectile fastening device at the point of penetration.
Figure 11:
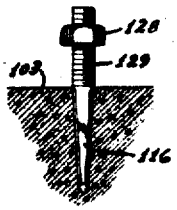
Figure 11 illustrates a fastening device in the position occupied when in use.

Figures 10 and 11 have been included in order to show the projectile at different stages after having been driven into the wall by the explosive force of the gun. In Figure 10 the hardened point 116 is shown already imbedded in the wall structure 103, but the jacket 124 is still on the projectile covering the threaded portion thereof. The gun barrel 15 has not yet been removed.

Immediately following the shooting of the projectile into the wall the gun barrel is removed, the jacket 124 is likewise removed baring the threads 129, and a nut 128, for example, may be applied to the threads to enable any structural piece, bracket or strap to be attached to the projectile.

One type of ammunition which has been found satisfactory is shown in detail in Figure 15. As there illustrated, the projectile, which may be appropriately referred to as a stud 131, comprises the hardened point 116, previously referred to and the threaded shank 129. Surrounding the threaded shank is a piston means 130 which may be formed of any desirable or suitable material such as, for example, metal, wood or paper. The shell casing 25 provides space for a powder charge 133 adapted to be ignited by a cap 134.

By winding the paper piston 130 directly over the threaded shank 129 of the stud 131 the threads make an excellent anchorage for the piston, thus preventing the stud from being driven out of the piston upon the initial explosion of the gases in the shell.

The piston likewise projects beyond the trailing end of the projectile as identified by the end of the threaded shank 129, thereby forming a shallow cup 132. The cup is expanded outwardly by the expanding gases when the shell is fired, thereby forming a tight seal between the piston and the bore 21 of the gun barrel 15. Also, since the paper forming the piston has comparatively little weight, substantially all of the energy of the powder explosion is stored in the stud 131 which is important in the operation of the apparatus described herein.

Although paper has been described as constituting a very satisfactory piston means, it will be appreciated that other relatively soft or fibrous materials having a corresponding lightness in weight may be employed with equally good effect.

In the apparatus herein described there has been provided a ready means for quickly and accurately driving fastening devices into concrete and masonry walls wherever it may be necessary. By use of the apparatus the necessity for setting the devices in the forms is obviated. New piping installations and other devices requiring hangers can be set wherever desired, and location of the fastening devices can be made as accurately as may be necessary with respect to the finished structure. The apparatus is sufficiently versatile so that it is capable of being used against practically any type of wall surface in that the power behind the driving of the fastening device is adjustable. Features are included which succeed in minimizing the disfigurement of the wall surface while at the same time improving the grip of the fastening device in the wall by reason of maintaining the wall intact. The efficiency of the device is further enhanced by providing a suitable recoil absorber so that continued operation by a workman does not become tiresome, thus improving his efficiency and shortening the time necessary to do a job of any magnitude.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent structures.

The invention having been herein described, what is claimed and sought to be secured by Letters Patent is:

1. In a gun adapted to drive fastening devices into a solid mass of dense aggregate material a casing, a barrel attached thereto having a breech end adapted to receive a cartridge, and means in the casing for absorbing the recoil effect comprising a breech block carrying a firing pin mechanism at one end and a piston section at the other end, said casing having a cushion comprising a gas pocket receiving the piston, and an inwardly opening check valve in a wall of the pocket.

2. In a gun adapted to drive fastening devices into a solid mass of dense aggregate material a casing, a barrel attached thereto having a breech end adapted to receive a cartridge, and means in the casing for absorbing the recoil effect comprising a breech block carrying a firing pin mechanism at one end and a piston section at the other end, said casing having a cushion comprising a gas pocket, an inwardly opening check valve in a wall of the pocket and a recoil return spring in said pocket.

3. In a gun adapted to drive fastening devices into a solid mass of dense aggregate material a casing, a barrel attached thereto having a breech end adapted to receive a cartridge, and means in the casing for absorbing the recoil effect comprising a movable breech block carrying a firing pin mechanism at one end and a piston section at the other end, said casing having a cylindrical bore slideably receiving the piston section at one end thereof forming an air pocket, a closure for the other end of the bore and an inwardly opening check valve in the closure and an auxiliary cushion in said bore.

4. In a gun adapted to drive fastening devices into a solid mass of dense aggregate material a casing, a barrel attached thereto having a breech end adapted to receive a cartridge, a handle grip thereon, and means in the casing for absorbing the recoil effect comprising a breech block carrying a firing pin mechanism at one end and a cup-shaped piston section at the other end, said casing having a cylindrical bore slideably receiving the piston at one end thereof forming an air pocket, a closure for the other end of the bore, an inwardly opening ball check valve in the closure, and a relatively heavy spring between the piston and the closure, and an adjustable valve between the pocket and the atmosphere.

[5. In a gun adapted to drive a fastening device into a solid mass of dense aggregate material a casing, a barrel having a discharge bore and a transverse escape passage therein communicating with the bore, and regulating means in the escape passage adapted to control the force of penetration of said fastening device comprising an adjustable discharge valve.]

6. In a gun adapted to drive fastening devices into a solid mass of dense aggregate material a casing, a barrel attached thereto and telescopically received within the casing, said barrel having an enlarged bore at the breech end providing an explosion chamber, and means for controlling the force of explosive gases comprising a fitting extending through the casing into the breech end of the barrel having an escape bore therein communicating with the explosion chamber, a relief port in communication with the escape bore and a thumb screw having movement adapted to regulate the effective size of the relief port.

7. In a gun adapted to drive fastening devices into a solid mass of dense aggregate material a casing, a barrel attached thereto and telescopically received within the casing, said barrel having an enlarged bore at the breech end and a sleeve in said bore providing an explosion chamber on the inside and a recess on the outside wall thereof providing an escape chamber, a transverse connecting passage between said chambers, and means for controlling the force of explosive gases by-passing through said connecting passage comprising a fitting extending through the casing into the breech end of the barrel having an escape bore therein communicating with the escape chamber, a relief port in communication with the escape bore, a thumb screw having movement adapted to regulate the effective size of the relief port and a pointer on the fitting cooperable with the screw for indicating the relative position of the thumb screw.

8. In a gun adapted to drive fastening devices into a solid mass of dense aggregate material a casing, a barrel having a discharge bore therein, a bucking block at the muzzle end of the barrel incorporating an area adapted to reception of force of expanding gas discharged by the gun and an auxiliary bore communicating between a space adjacent said area and a portion of the discharge bore remote from the muzzle end.

9. In a gun adapted to drive fastening devices into a solid mass of dense aggregate material a casing, a barrel attached thereto having a bore therein, a transverse gas passage through the barrel adjacent the breech end thereof in the area of discharge, an auxiliary bore in the barrel communicating between the gas passage and an outlet at the muzzle end, and a buffer at the muzzle end comprising a block having a coaxial discharge bore, opposed shoulders respectively on the barrel and the block and a cushion between said shoulders, said block being spaced from the muzzle end of the barrel providing thereby a piston head adjacent the outlet of the auxiliary bore for reception of the force of gas from said auxiliary bore.

10. In a gun adapted to drive fastening devices into a solid mass of dense aggregate material a casing, a barrel attached thereto having a bore therein and an enlargement of said bore at the breech, a shell carrying sleeve in the enlargement, a transverse gas passage through the sleeve at a distance from the breech end thereof in excess of the length of a shell, a longitudinally disposed auxiliary bore in the barrel communicating between the gas passage and an outlet at the muzzle end, and a buffer at the muzzle end comprising a block having a coaxial discharge bore, a sleeve surrounding said block and a muzzle end of the barrel, opposed shoulders respectively on the barrel and the block and a coiled spring between said shoulders, said block being spaced from the muzzle end of the barrel providing thereby a piston head for reception of the force of gas from said auxiliary bore.

11. In a gun adapted to drive a fastening projectile into a solid mass of dense aggregate material the combination of a barrel having a discharge bore therein, a lateral gas escape adjacent the muzzle end, an anvil having a sliding position in the bore adjacent the escape adapted to rest upon a fastening projectile and a piston adapted to be driven through the bore into contact with the anvil under force of an explosive charge.

12. In a gun for firing projectile loaded shells, a casing having a recoil section, a barrel holding section and a longitudinally extending laterally disposed hinge comprising a pivot connection between said sections, a recoil block in the recoil section, a barrel telescopically retained in the barrel section and having a limited slideable connection thereto, said barrel having an enlarged recess therein and a shell holding sleeve mounted for limited axially sliding movement in said recess, said sleeve having a releasable connection with the recoil block.

13. In a gun for firing projectile loaded shells, a casing having a recoil section, a barrel holding section and a longitudinally extending laterally disposed hinge comprising a pivot connection between said section, a recoil block in the recoil section, a barrel telescopically retained in the barrel section and having a limited slideable connection thereto, said barrel having an enlarged recess therein and a shell holding sleeve mounted for limited axially sliding movement in said recess, said sleeve having a releasable connection with the recoil block, said connection comprising bayonet elements respectively on the sleeve and the recoil block.

14. In a gun adapted to drive fastening devices into a solid mass of dense aggregate material a casing, a barrel attached thereto having a breech end adapted to receive a cartridge, a handle grip thereon, and means in the casing for absorbing the recoil effect comprising a breech block carrying a firing pin mechanism at one end and a cup-shaped piston section at the other end, said casing having a cylindrical bore slideably receiving the piston at one end thereof forming an air pocket, a closure for the other end of the bore, an inwardly opening ball check valve in the closure, and a shock absorbing cushion between the breech block and the handle.

*15. In a gun adapted to drive a fastening device into a solid mass of dense aggregate, a casing, a barrel mounted in said casing for telescoping movement with respect thereto, said barrel having a bore therein which is open at one end of the barrel, means mounted in said casing adjacent the rear end of the bore of the barrel for receiving an explosive charge for driving said fastening device, the open end of said barrel providing an abutment to engage said material, said barrel having a passage communicating with the bore therein, and means in the passage adapted to control the force of penetration of said fastening device.*

*16. In a gun as recited in claim 15 in which said last means comprises adjustable discharge valve.*

ROBLEY F. SOPRIS.

REFERENCES CITED

The following references are of record in the file of this patent or the original patent:

UNITED STATES PATENTS

| Number | Name | Date |
|---|---|---|
| 1,480,957 | Schneider | Jan. 15, 1924 |
| 1,984,117 | Davis | Dec. 11, 1934 |
| 2,030,803 | Temple | Feb. 11, 1936 |
| 2,166,041 | Cox | July 11, 1939 |
| 2,213,435 | Temple | Sept. 3, 1940 |
| 2,221,157 | Temple | Nov. 12, 1940 |
| 2,359,515 | Fanger | Oct. 3, 1944 |
| 2,378,735 | Shaffer | June 19, 1945 |
| 2,395,354 | Temple | Feb. 19, 1946 |
| 2,400,878 | Dunn | May 28, 1946 |